US012623345B2

(12) United States Patent
Kawakami et al.

(10) Patent No.: US 12,623,345 B2
(45) Date of Patent: May 12, 2026

(54) PATH GENERATION METHOD OF GENERATING PATH OF ROBOT USING COMMAND FROM EXTERNAL APPARATUS AND ROBOT CONTROL SYSTEM

(71) Applicant: SEIKO EPSON CORPORATION, Tokyo (JP)

(72) Inventors: Daichi Kawakami, Matsumoto (JP); Yuki Kiyosawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 286 days.

(21) Appl. No.: 18/302,838

(22) Filed: Apr. 19, 2023

(65) Prior Publication Data

US 2023/0339113 A1 Oct. 26, 2023

(30) Foreign Application Priority Data

Apr. 20, 2022 (JP) ................................. 2022-069465

(51) Int. Cl.
*B25J 9/16* (2006.01)

(52) U.S. Cl.
CPC ........... *B25J 9/1664* (2013.01); *B25J 9/1651* (2013.01)

(58) Field of Classification Search
CPC ..... B25J 9/1664; B25J 9/1651; G05B 19/416; G05B 2219/33219; G05B 2219/34095; G05B 2219/34153; G05B 2219/34169; G05B 2219/34279; G05B 2219/43041; G05B 2219/43062; G05B 2219/43203; G05B 19/4103
See application file for complete search history.

(56) References Cited

U.S. PATENT DOCUMENTS

| | | | | |
|---|---|---|---|---|
| 4,769,583 A | * | 9/1988 | Goor | G05B 19/237 |
| | | | | 700/63 |
| 2013/0197688 A1 | * | 8/2013 | Egi | G05B 19/18 |
| | | | | 700/180 |
| 2021/0370504 A1 | * | 12/2021 | Beardsworth | B25J 9/1653 |
| 2024/0045435 A1 | * | 2/2024 | Jorge | G05D 1/0217 |

FOREIGN PATENT DOCUMENTS

| | | |
|---|---|---|
| CN | 108549328 A | 9/2018 |
| JP | 2020-004364 A | 1/2020 |

* cited by examiner

*Primary Examiner* — Dylan M Katz

(74) *Attorney, Agent, or Firm* — Harness, Dickey & Pierce, P.L.C.

(57) ABSTRACT

A method of the present disclosure is a path generation method of generating a path of a robot using a command from an external apparatus, including (a) sequentially receiving command information including a control command from the external apparatus, and (b) determining a path position with interpolation between a first target position and a second target position. The step (b) includes (b1) obtaining the path position by performing linear interpolation between the first target position and the second target position, (b2) determining whether or not path speed at the second target position is no lower than lower limit speed, and (b3) correcting the path speed between the first target position and the second target position so as to become no lower than the lower limit speed when it is determined that the path speed at the second target position fails to be no lower than the lower limit speed.

4 Claims, 8 Drawing Sheets

FIG. 7

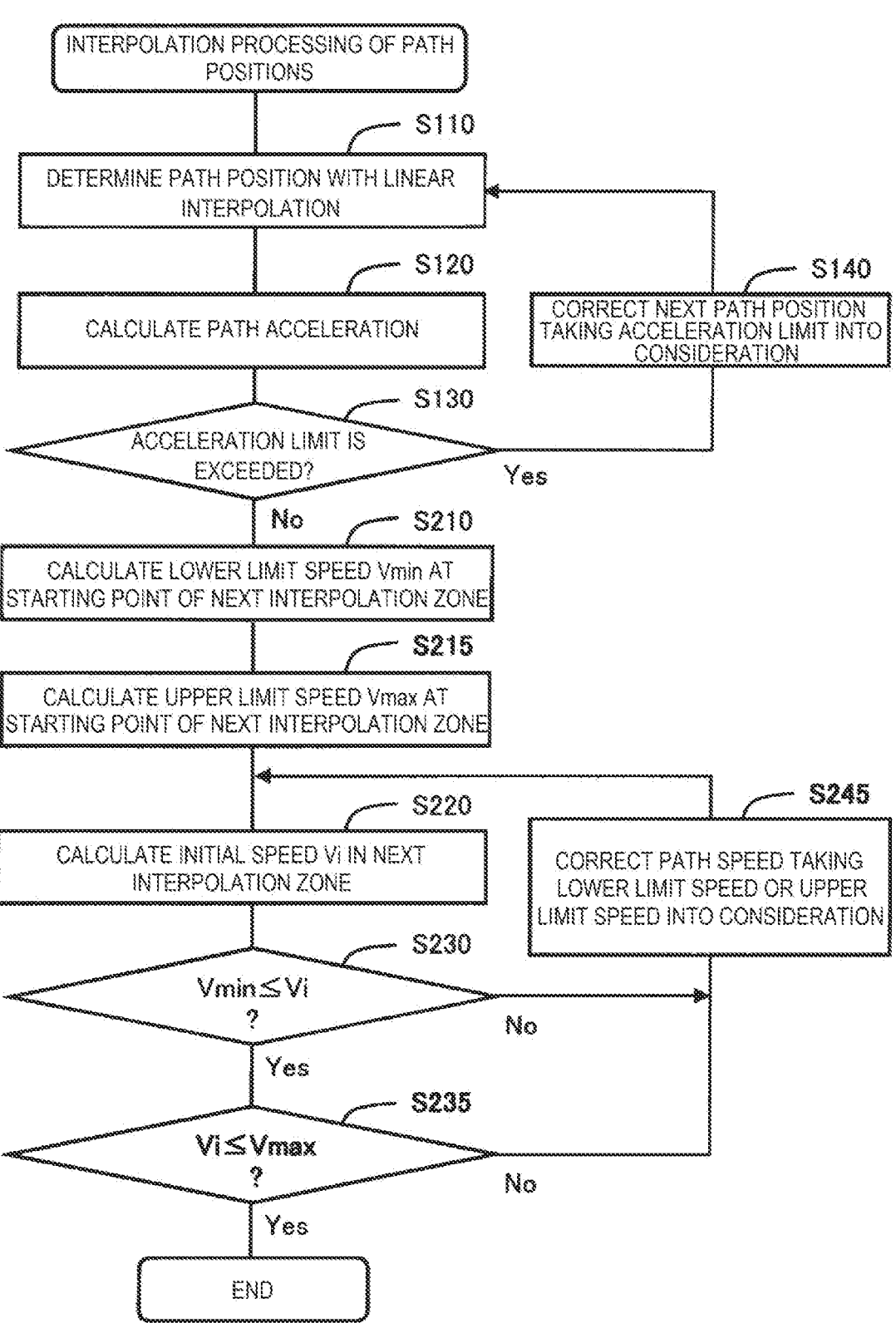

INTERPOLATION PROCESSING OF PATH POSITIONS

S110

DETERMINE PATH POSITION WITH LINEAR INTERPOLATION

S120

CALCULATE PATH ACCELERATION

S140

CORRECT NEXT PATH POSITION TAKING ACCELERATION LIMIT INTO CONSIDERATION

S130

ACCELERATION LIMIT IS EXCEEDED?

Yes

No   S210

CALCULATE LOWER LIMIT SPEED Vmin AT STARTING POINT OF NEXT INTERPOLATION ZONE

S215

CALCULATE UPPER LIMIT SPEED Vmax AT STARTING POINT OF NEXT INTERPOLATION ZONE

S220

CALCULATE INITIAL SPEED Vi IN NEXT INTERPOLATION ZONE

S245

CORRECT PATH SPEED TAKING LOWER LIMIT SPEED OR UPPER LIMIT SPEED INTO CONSIDERATION

S230

Vmin ≤ Vi ?

No

Yes

S235

Vi ≤ Vmax ?

No

Yes

END

PATH GENERATION METHOD OF GENERATING PATH OF ROBOT USING COMMAND FROM EXTERNAL APPARATUS AND ROBOT CONTROL SYSTEM

The present application is based on, and claims priority from JP Application Serial Number 2022-069465, filed Apr. 20, 2022, the disclosure of which is hereby incorporated by reference herein in its entirety.

BACKGROUND

1. Technical Field

The present disclosure relates to a path generation method of generating a path of a robot using a command from an external apparatus, and a robot control system.

2. Related Art

In the past, there has been known a system in which a robot control device controls a robot with a control command from an external apparatus. In JP-A-2020-4364, there is disclosed a motion control method which realizes path control by performing interpolation between command positions when a period between the control commands from the external apparatus is longer than a motion control cycle of the robot. As an interpolation method, in general, it is possible to use quintic spline interpolation or linear interpolation. In a high-order interpolation method such as the quintic spline interpolation, there is performed the interpolation based on a number of pieces of position information, and therefore, there is a problem that it is difficult to change a motion of a controlled object during an operation, and the linear interpolation is preferable as the interpolation method. However, in the simple linear interpolation, there can arise the case in which the path control cannot appropriately be performed. For example, there can arise the case in which the speed becomes insufficient at an end point of an interpolation zone, and it is unachievable to reach a target position at an endpoint of the next interpolation zone. Alternatively, there can also occur the case in which the acceleration in the path exceeds the acceleration limit.

SUMMARY

According to a first aspect of the present disclosure, there is provided a path generation method of generating a path of a robot using a command from an external apparatus. This path generation method includes (a) sequentially receiving command information including a control command from the external apparatus with a second control period longer than a first control period as a control period of a path related to a target position of a joint of the robot, and (b) determining a path position in each of the first control periods with interpolation between a first target position and a second target position next to the first target position using a first control command representing the first target position and a second control command representing the second target position. The step (b) includes (b1) obtaining the path position in each of the first control periods by performing linear interpolation between the first target position and the second target position, (b2) determining whether or not path speed at the second target position is no lower than lower limit speed at which a third target position next to the second target position is reached at an estimated arrival time at the third target position when assuming that the path speed at the second target position is accelerated at an acceleration limit to the third target position using a third control command representing the third target position, and (b3) correcting the path speed between the first target position and the second target position so that the path speed at the second target position becomes no lower than the lower limit speed when it is determined that the path speed at the second target position fails to be no lower than the lower limit speed.

According to a second aspect of the present disclosure, there is provided a robot control system. The robot control system is provided with a robot having a servo controller, a robot controller configured to transmit a control command to the servo controller, and an external apparatus configured to sequentially transmit command information including a control command to the robot controller with a second control period longer than a first control period as a control period of a path related to a target position of a joint of the robot. The robot controller is configured to execute (a) processing of sequentially receiving the command information from the external apparatus with the second control period, and (b) processing of determining a path position in each of the first control periods with interpolation between a first target position and a second target position next to the first target position using a first control command representing the first target position and a second control command representing the second target position. The processing (b) includes (b1) processing of obtaining the path position in each of the first control periods by performing linear interpolation between the first target position and the second target position, and (b2) processing of correcting the path position so that path acceleration obtained from an interpolation result of the linear interpolation becomes no higher than acceleration limit when the path acceleration exceeds the acceleration limit.

BRIEF DESCRIPTION OF THE DRAWINGS

FIG. 7 is a flowchart showing a procedure of interpolation processing of path positions in a second embodiment.

DESCRIPTION OF EXEMPLARY EMBODIMENTS

A. First Embodiment

Figure 1:
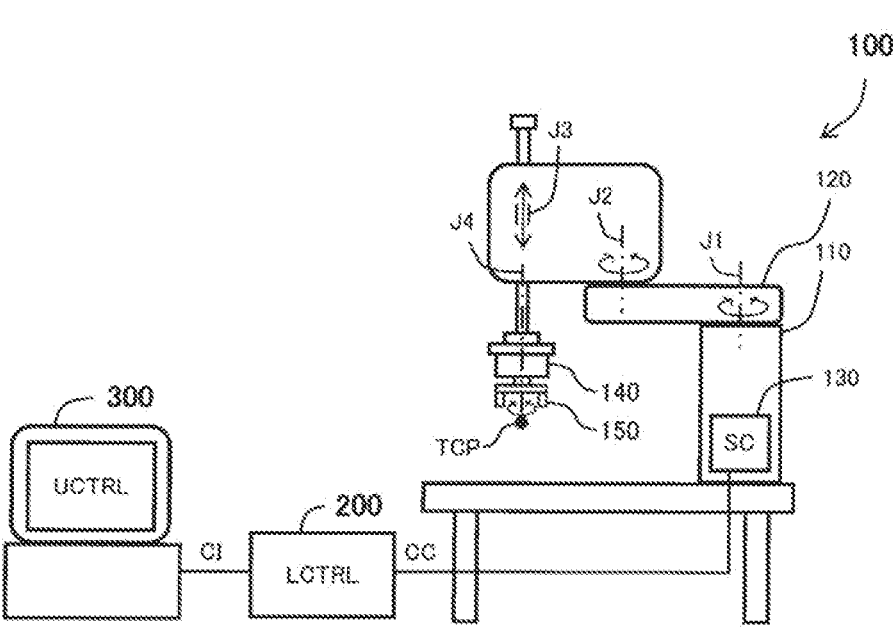
FIG. 1 is an explanatory diagram showing a configuration of a robot control system according to an embodiment.

FIG. 1 is an explanatory diagram showing an example of a robot control system according to an embodiment. This robot control system is provided with a robot 100, a subordinate control device 200 for transmitting a control command CC to the robot 100, and a superior control device 300 for transmitting command information CI for generating the control command CC to the subordinate control device 200. The subordinate control device 200 is, for example, a robot controller, and the superior control device 300 is, for example, a personal computer. It should be noted that the subordinate control device 200 can also be referred to as a "first control device," and the superior control device 300 can also be referred to as a "second control device." The superior control device 300 is an external apparatus of the robot 100.

The robot 100 is provided with a platform 110, a robot arm 120, and a servo controller 130. The servo controller 130 executes servo control related to actuators for operating joints of the robot arm 120. The servo controller 130 is coupled to the subordinate control device 200 as an external apparatus.

The robot arm 120 is sequentially coupled with four joints J1 through J4. On a tip portion of the robot arm 120, there are mounted a kinesthetic sensor 140 and an end effector 150. The kinesthetic sensor 140 can be eliminated. Further, it is possible to provide other sensors such as a gyro sensor and a vibration sensor to the robot arm 120. In the vicinity of the tip of the robot arm 120, there is seta TCP (Tool Center Point) as a control point of the robot 100. There is illustrated a four-axis robot having the four joints J1 through J4 in the present embodiment, but it is possible to use a robot having an arbitral arm mechanism having a plurality of joints. Further, the robot 100 according to the present embodiment is a horizontal articulated robot, but it is possible to use a vertical articulated robot.

Figure 2:
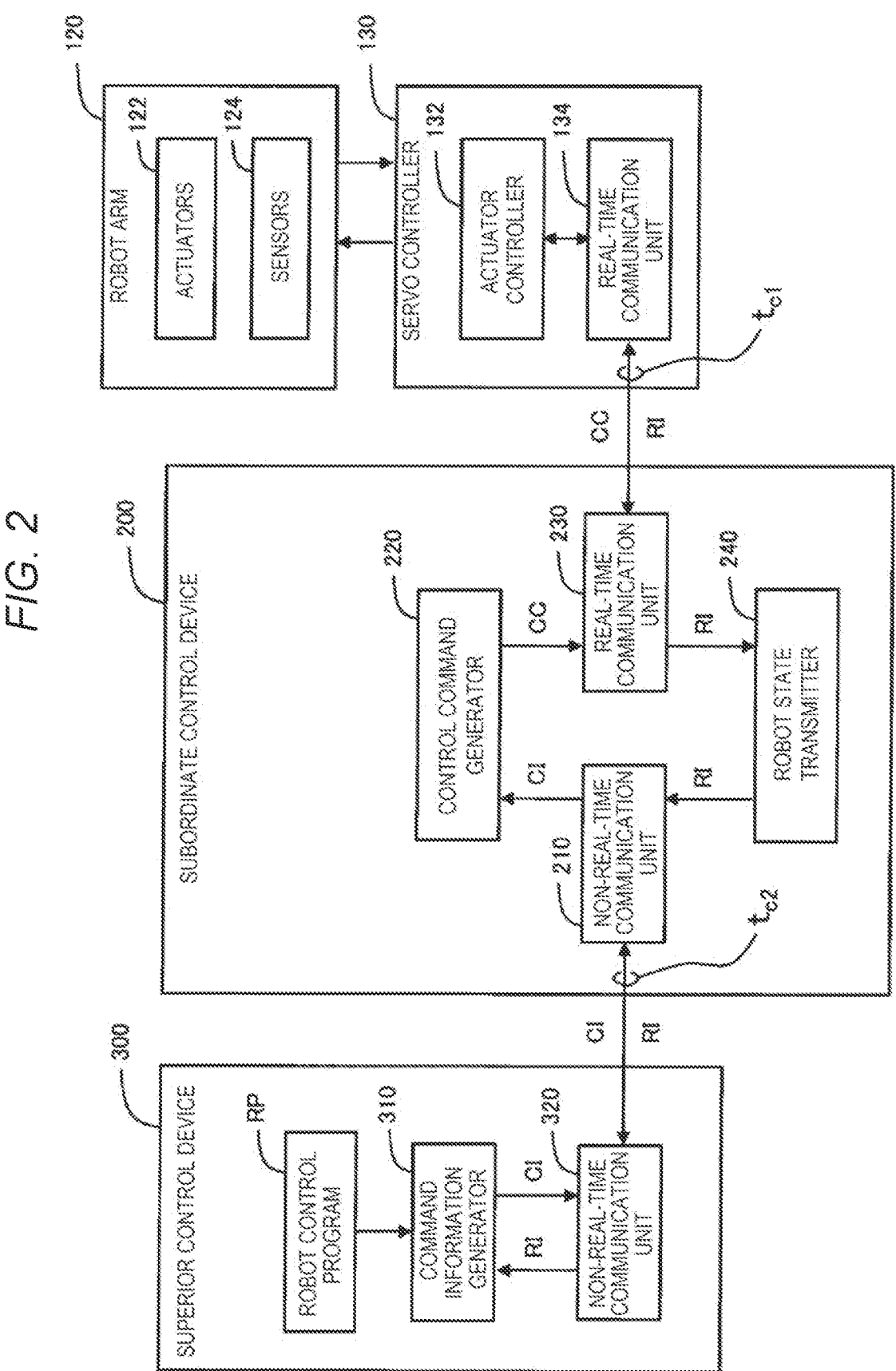
FIG. 2 is a functional block diagram of the robot control system.

FIG. 2 is a functional block diagram of the robot control system. The subordinate control device 200 transmits the control command CC to the servo controller 130 in sync with a control period $t_{c1}$ of the robot set in advance to control the robot 100, and at the same time, receives robot state information RI from the servo controller 130 to transmit the robot state information RI to the superior control device 300. It is possible for the superior control device 300 to generate the next command information CI using the robot state information RI as needed. The superior control device 300 transmits the command information CI with a control period $t_{c2}$ as a longer control period than the control period $t_{c1}$ of the subordinate control device 200 to the subordinate control device 200.

It is preferable for the superior control device 300 to be configured so as to generate the command information CI using an ROS (Robot Operating System) as versatile control software which does not depend on the model and the manufacturer of the robot 100. In contrast, it is preferable for the subordinate control device 200 to be configured so as to generate the control command CC from the command information CI using specific control software suitable for the model of the robot 100. By combining the superior control device 300 and the subordinate control device 200 described above with each other, it is possible to easily construct a system capable of executing the control of the robot 100 irrespective of the model and the manufacturer of the robot 100.

The robot arm 120 includes actuators 122 and sensors 124. The actuators 122 are respectively provided to the individual joints, and are used for operating the individual joints. The actuators 122 each include an encoder as a position sensor for representing a position of the individual joints. In the present disclosure, the "position" of the joint means a displacement or an angle of the joint. Further, the "speed" means a temporal differentiation of the displacement or angular velocity, and the "acceleration" means a second-order differentiation of the displacement or angular acceleration. The sensors 124 include a variety of sensors such as the kinesthetic sensor 140 shown in FIG. 1. The robot state information RI is information representing the state of the robot 100, and includes position data as detection values of the encoders in the plurality of joints and sensor values as detection values of the sensors 124.

The servo controller 130 has an actuator controller 132 for executing the control of the actuators 122, and a real-time communication unit 134. The real-time communication unit 134 has a function of performing synchronous communication with the subordinate control device 200 with the control period $t_{c1}$. In the present embodiment, the control period $t_{c1}$ is 2 ms. The servo controller 130 and the subordinate control device 200 are coupled to each other with a protocol capable of performing real-time communication with a constant period, and is coupled to each other with, for example, EtherCAT (Ethernet Control Automation Technology). In EtherCAT, digital data, analog data, and process data to which input/output information such as an encoder value is coupled can be communicated while being carried on an Ethernet frame. In the EtherCAT connection, the subordinate control device 200 functions as a master, while the servo controller 130 functions as a slave. The subordinate control device 200 and the superior control device 300 are coupled to each other with a protocol for performing non-real-time communication, and are coupled to each other with, for example, Ethernet.

The superior control device 300 has a command information generator 310 and a non-real-time communication unit 320. The command information generator 310 generates a trajectory of the robot arm 120 with a robot control program RP generated in advance, and then generates the command information CI for making the robot arm 120 operate with that trajectory. The command information CI includes a position command for making the robot arm 120 operate. The position command is a command representing target positions of the plurality of joints provided to the robot 100, and represents the target position of every control period $t_{c2}$. The non-real-time communication unit 320 executes non-real-time communication with the non-real-time communication unit 210 of the subordinate control device 200. As described above, in the present embodiment, the superior control device 300 and the subordinate control device 200 are coupled to each other with Ethernet. In the non-real-time communication, the command information CI is transmitted from the superior control device 300 to the subordinate control device 200, and further, the robot state information RI is transmitted from the subordinate control device 200 to the superior control device 300. As described above, the robot state information RI includes position data of the joints of the robot arm 120, and sensor values of the sensors 124.

The command information generator 310 executes processing of generating the command information CI in accordance with the robot control program RP. The command information CI is generated using the robot state information RI in accordance with the robot control program RP.

The subordinate control device 200 has the non-real-time communication unit 210, a control command generator 220, a real-time communication unit 230, and a robot state transmitter 240. The command information CI transmitted from the superior control device 300 is received by the non-real-time communication unit 210, and is transferred to the control command generator 220. The control command generator 220 generates the control command CC in accordance with the command information CI. In the generation of the control command CC, the control command generator 220 executes path generation processing of generating path positions of the respective joints. The "path position" means both of a position set between the target positions using interpolation, and the target position. In the path generation processing, by interpolating the plurality of target positions designated by the plurality of pieces of command information CI, the path positions between the plurality of target positions are determined. The real-time communication unit 230 transmits the control command CC to the servo controller 130 every control period $t_{c1}$, and at the same time, receives the robot state information RI from the servo controller 130. The robot state information RI is transmitted from the robot state transmitter 240 to the superior control device 300 via the non-real-time communication unit 210.

The servo controller 130 of the robot 100 executes the path control for achieving the target positions of the respective joints of the robot 100 in accordance with the control command CC received from the subordinate control device 200. In other words, the actuator controller 132 executes the path control for controlling the actuators 122 of the respective joints using the path positions obtained by the interpolation. The control period $t_{c1}$ with which the servo controller 130 receives the control command CC from the subordinate control device 200 is referred to as a "first control period $t_{c1}$," and the control period $t_{c2}$ with which the subordinate control device 200 receives the command information CI from the superior control device 300 is referred to as a "second control period $t_{c2}$." The first control period $t_{c1}$ is set shorter than the second control period $t_{c2}$. The servo controller 130 sequentially receives the control commands CC including the target positions from the subordinate control device 200 with the first control period $t_{c1}$ shorter than the second control period $t_{c2}$. It is preferable for the first control period $t_{c1}$ to be set to a value obtained by dividing the second control period $t_{c2}$ by an integer.

Figure 3:
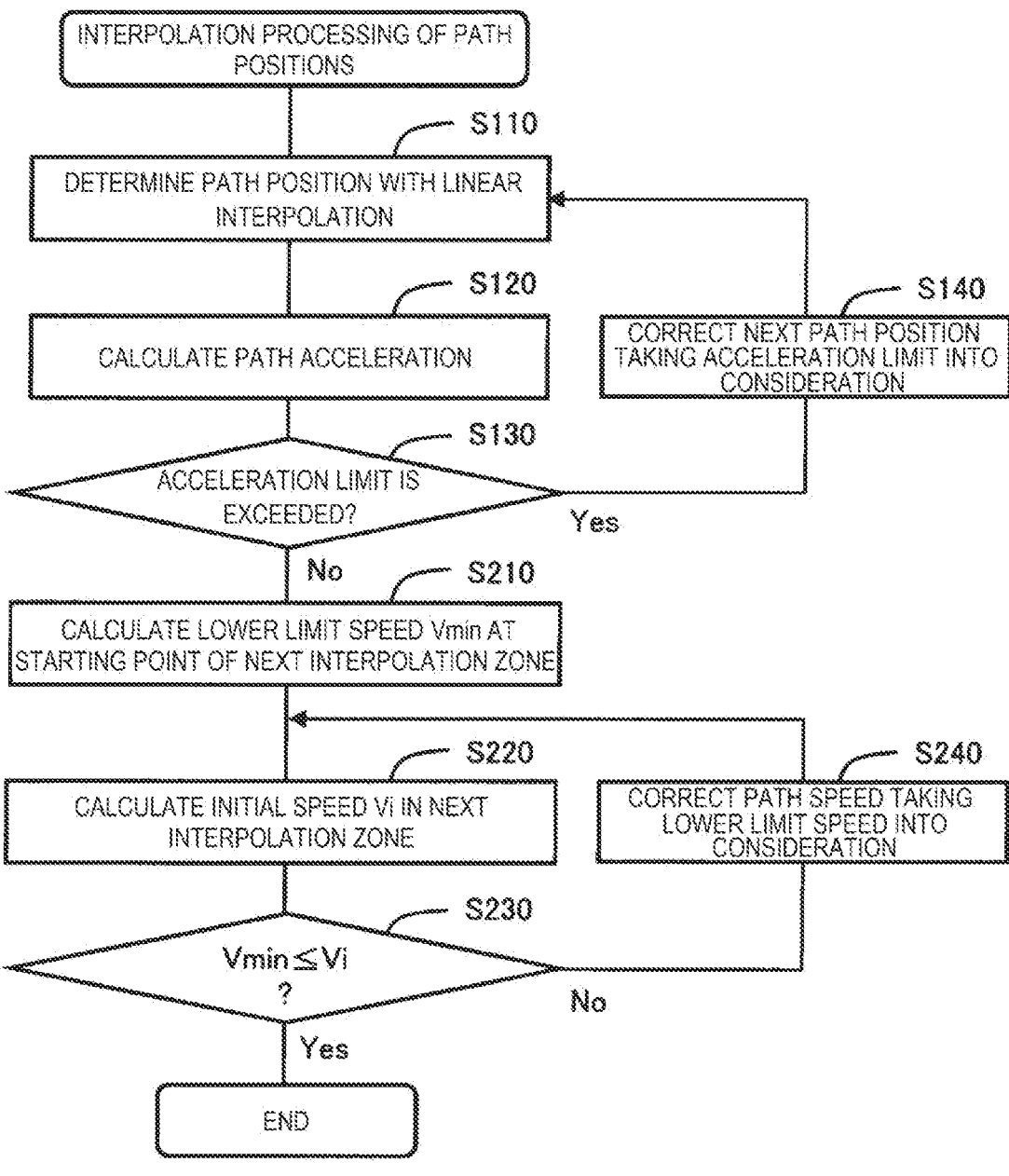
FIG. 3 is a flowchart showing a procedure of interpolation processing of path positions in a first embodiment.

FIG. 3 is a flowchart showing a procedure of interpolation processing of path positions in the first embodiment. The interpolation processing is started at a time point when the control command generator 220 receives a plurality of, namely a predetermined number of, pieces of command information CI. In the step S110, the control command generator 220 performs linear interpolation between two target positions to thereby determine a plurality of path positions.

Figure 4A:
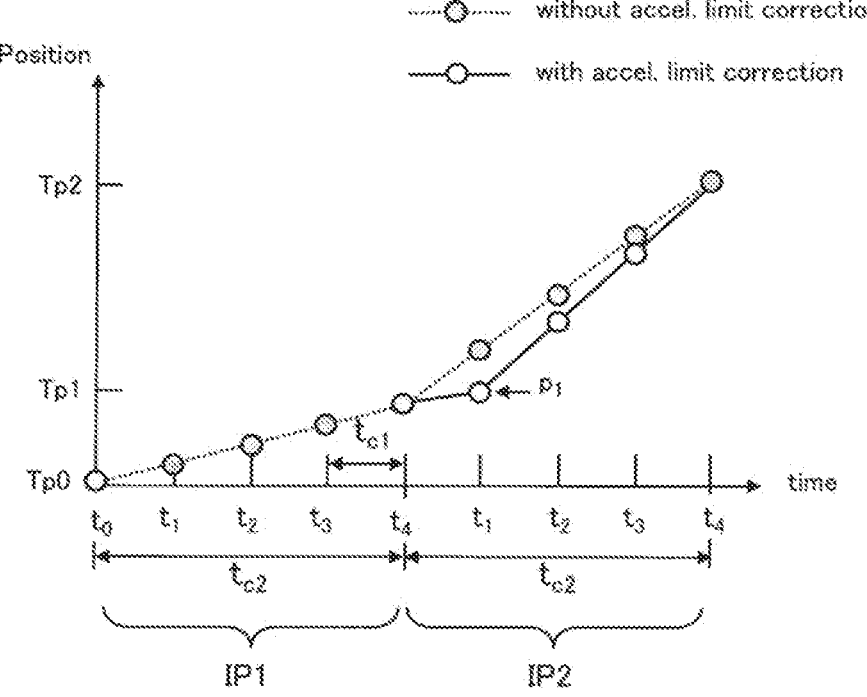
FIG. 4A is a graph showing the path positions by a correction in which a restriction of an acceleration limit is considered.

FIG. 4A shows an example of the path positions as an interpolation processing result of the path positions. In FIG. 4A, the horizontal axis represents time, and the vertical axis represents positions. In this example, there are set three target positions Tp0, Tp1, and Tp2. In the horizontal axis, there are drawn an interpolation zone IP1 between the target positions Tp0, Tp1, and an interpolation zone IP2 between the target positions Tp1, Tp2. These interpolation zones IP1, IP2 each have the length of the second control period $t_{c2}$ for receiving the control command CC. The second control period $t_{c2}$ is sectioned into a plurality of first control periods $t_{c1}$. The first control periods $t_{c1}$ correspond to time intervals for setting a plurality of path positions between the two target positions Tp0, Tp1. In the example shown in FIG. 4A, the first control period $t_{c1}$ is a fourth of the second control period $t_{c2}$, and there are drawn a start time point $t_0$ of the interpolation zone, and end time points $t_1$ through $t_4$ of each of the first control periods $t_{c1}$ in the interpolation period. In general, assuming m as an integer no smaller than 2, it is possible to set the second control period $t_{c2}$ to a length m times as large as the first control period $t_{c1}$. The integer m is also referred to as an "interpolation number."

In the linear interpolation, assuming that the interpolation number m is an integer no smaller than 2, and k is an integer from 1 to m, the path position $p_k$ between arbitrary two target positions $Tp_N$, $Tp_{N+1}$ is determined as follows every time point $t_k$ in that zone.

[Math. 1]

$$p_k = Tp_N + k * \Delta p \tag{1a}$$

$$\Delta p = (Tp_{N+1} - Tp_N)/m \tag{1b}$$

In FIG. 4A, the path positions represented by dots of "without accel. limit correction" are the path positions on which the linear interpolation in the step S110 shown in FIG. 3 is performed. In the first interpolation zone IP1, the linear interpolation is performed between the two target positions Tp0, Tp1. Similarly, in the second interpolation zone IP2, the linear interpolation is performed between the two target positions Tp1, Tp2.

Figure 4B:
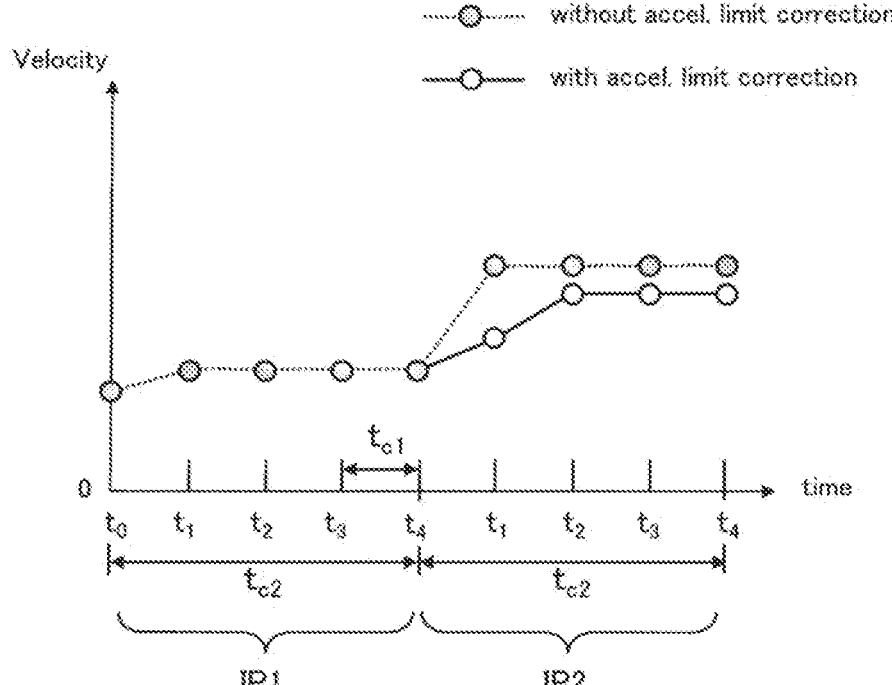
FIG. 4B is a graph showing path speed by the correction in which the restriction of the acceleration limit is considered.
Figures 4C, 5A:
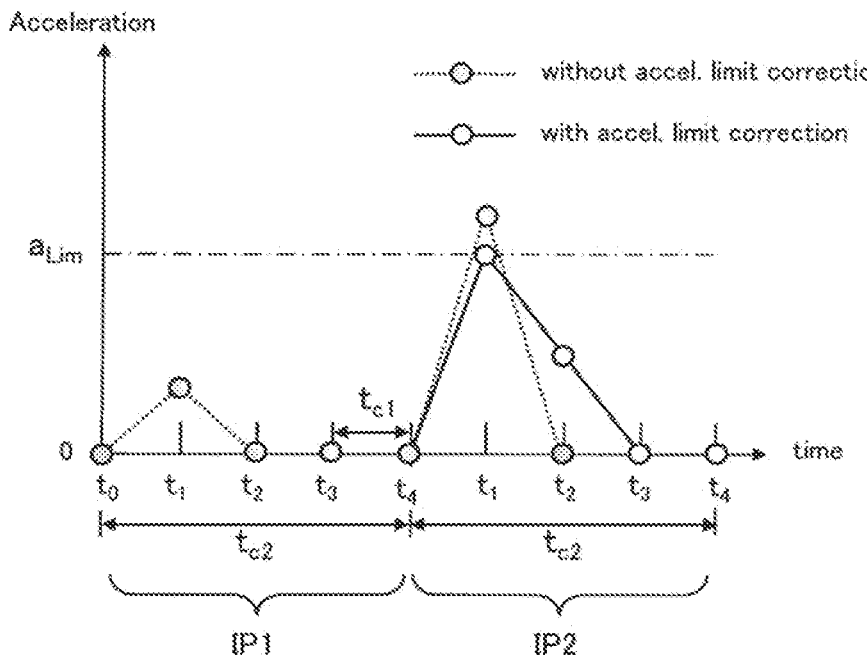
FIG. 4C is a graph showing path acceleration by the correction in which the restriction of the acceleration limit is considered.
FIG. 5A is a graph showing path positions by a correction in which lower limit speed in the next interpolation zone is considered.

FIG. 4B and FIG. 4C respectively show examples of path speed and path acceleration as the interpolation processing result of the path positions, and are the results corresponding to the path positions shown in FIG. 4A. The vertical axis of FIG. 4B represents the speed, and the vertical axis of FIG. 4C represents the acceleration. In FIG. 4C, the path acceleration represented by dots of "without accel. limit correction" exceeds an acceleration limit $a_{Lim}$ at the time point $t_1$ in the interpolation zone IP2. The acceleration limit $a_{Lim}$ is a maximum value of the acceleration which each of the actuators 122 can achieve, and is determined in advance for each of the actuators 122. When the path acceleration exceeds the acceleration limit $a_{Lim}$, the path position cannot be realized, and therefore, it is preferable to correct the path acceleration to be no higher than the acceleration limit $a_{Lim}$.

In the steps S120 through S140 shown in FIG. 3, when the path acceleration corresponding to the path position determined by the simple linear interpolation in the step S110 exceeds the acceleration limit $a_{Lim}$, the path position is corrected so that the path acceleration becomes no higher than the acceleration limit $a_{Lim}$. Specifically, the path acceleration is calculated in the step S120, and whether or not the path acceleration exceeds the acceleration limit $a_{Lim}$ is determined in the step S130. When the path acceleration does not exceed the acceleration limit $a_{Lim}$, the process proceeds to the next step S210. In contrast, when the path acceleration exceeds the acceleration limit $a_{Lim}$, the process proceeds to the step S140, and the next path position is corrected taking the acceleration limit $a_{Lim}$ into consideration. Specifically, the next path position is corrected so that the path acceleration becomes no higher than the acceleration limit $a_{Lim}$.

In the step S140, the next path position $p_n$ is determined, for example, as follows.

[Math. 2]

$$p_n = p_{n-1} + \Delta p_n \quad [2a]$$

$$\Delta p_n = (a_{Lim} * d) * t_{c1} + \Delta p_{n-1} \quad [2b]$$

Here, $p_n$ represents the path position to be determined by the present correction, $p_{n-1}$ represents the previous path position, $\Delta p_n$ represents an additional value for determining the present path position $p_n$, $\Delta p_{n-1}$ represents an additional value when determining the previous path position $p_{n-1}$, $a_{Lim}$ represents the acceleration limit, $t_{c1}$ represents the first control period, and d represents a constant fulfilling 0d≤1.

The dots drawn as "with accel. limit correction" in FIG. 4 represent the result obtained by the correction in the step S140. At the time point $t_1$ in the second interpolation zone IP2, the path position $p_1$ is corrected with the formulas [2a], [2b] described above. In this example, the constant d is set as 1.0. As shown in FIG. 4C, the acceleration at the time point $t_1$ is set to a value equal to the acceleration limit $a_{Lim}$.

When the correction in the step S140 is completed, the process returns to the step S110, and the linear interpolation between the path position $p_n$ corrected in the step S140 and the next target position is performed. In the example shown in FIG. 4A, the linear interpolation is performed between the path position $p_1$ corrected as the position at the time point $t_1$ and the next target position $Tp_2$. As shown in FIG. 4C, in the result of the linear interpolation between these positions $p_1$, $Tp_2$, since the path acceleration is lower than the acceleration limit $a_{Lim}$ at any of the path positions, the processing in the steps S110 through S140 is terminated. As described above, in the processing in the steps S110 through S140, it is possible to determine the path positions using the linear interpolation without causing the exceedance over the acceleration limit.

The steps S210 through S240 are processing of correcting the path positions taking a lower limit speed in the next interpolation zone into consideration. The "next interpolation zone" means the next interpolation zone to the interpolation zone subject to the present interpolation. For example, when assuming the present interpolation zone as a zone from the first target position $Tp_N$ to the second target position $Tp_{N+1}$, the next interpolation zone is a zone from the second target position $Tp_{N+1}$ to the third target position $Tp_{N+2}$. The "lower limit speed in the next interpolation zone" means the speed at the second target position $Tp_{N+1}$, and is the speed at which the third target position $Tp_{N+2}$ is reached at an estimated arrival time at the third target position $Tp_{N+2}$ when assuming that the acceleration is subsequently performed at the acceleration limit $a_{Lim}$ to the third target position $Tp_{N+2}$.

In the step S210, a lower limit speed $V_{min}$ at the starting point of the next interpolation zone is calculated. The lower limit speed $V_{min}$ can be calculated with, for example, the following formula.

[Math. 3]

$$V_{min} = \frac{\left[ (Tp_{N+2} - Tp_{N+1}) - \frac{1}{2} a_{Lim} * t_{c2}^2 \right]}{t_{c2}} \quad [3]$$

$$= \frac{\left[ (Tp_{N+2} - Tp_{N+1}) - \frac{1}{2} a_{Lim} * (t_{c1} * m)^2 \right]}{t_{c1} * m}$$

Here, $Tp_{N+1}$ represents the second target position, $Tp_{N+2}$ represents the third target position, $a_{Lim}$ represents the acceleration limit, $t_{c1}$ represents the first control period, $t_{c2}$ represents the second control period, and m represents the interpolation number.

A second term of a numerator in a right-hand side of the formula [3] described above corresponds to a positional variation due to a speed variation, namely an increment in distance due to the acceleration, when performing the acceleration at the acceleration limit $a_{Lim}$ from the second target position $Tp_{N+1}$ until the third target position $Tp_{N+2}$ is reached. The lower limit speed $V_{min}$ at the starting point of the next interpolation zone is obtained by subtracting the positional variation from a difference between the third target position $Tp_{N+2}$ and the second target position $Tp_{N+1}$, and then dividing the subtraction result by a length of the second control period $t_{c2}$.

When expressing the formula [3] described above with discrete values in every first control period $t_{c1}$, the formula [3] can be rewritten to the following formula [4].

[Math. 4]

$$\Delta p'_{min} = \frac{\left[ (Tp_{N+2} - Tp_{N+1}) - \sum_{k=1}^{m} \{ (a_{Lim} * t_{c1}) * k \} \right]}{m} \quad [4]$$

Here, $\Delta p'_{min}$ represents a lower limit value of the positional increment at the starting point of the next interpolation zone, and is substantively the same as the lower limit speed $V_{min}$ in the formula [3] described above.

A second term of a numerator in a right-hand side of the formula [4] described above corresponds to a positional variation due to a speed variation when performing the acceleration at the acceleration limit $a_{Lim}$ from the second target position $Tp_{N+1}$ until the third target position $Tp_{N+2}$ is reached. Further, the interpolation number m in the denominator in the right-hand side of the formula [4] is a value corresponding to the length of the second control period $t_{c2}$. As described above, the lower limit speed $V_{min}$ or $\Delta p'_{min}$ at the starting point of the next interpolation zone can be obtained by subtracting the positional variation due to the speed variation when performing the acceleration at the acceleration limit $a_{Lim}$ from the second target position $Tp_{N+1}$ until the third target position $Tp_{N+2}$ is reached from the difference between the third target position $Tp_{N+2}$ and the second target position $Tp_{N+1}$, and then dividing the subtraction result by a value corresponding to the length of the second control period $t_{c2}$.

Figure 5B:
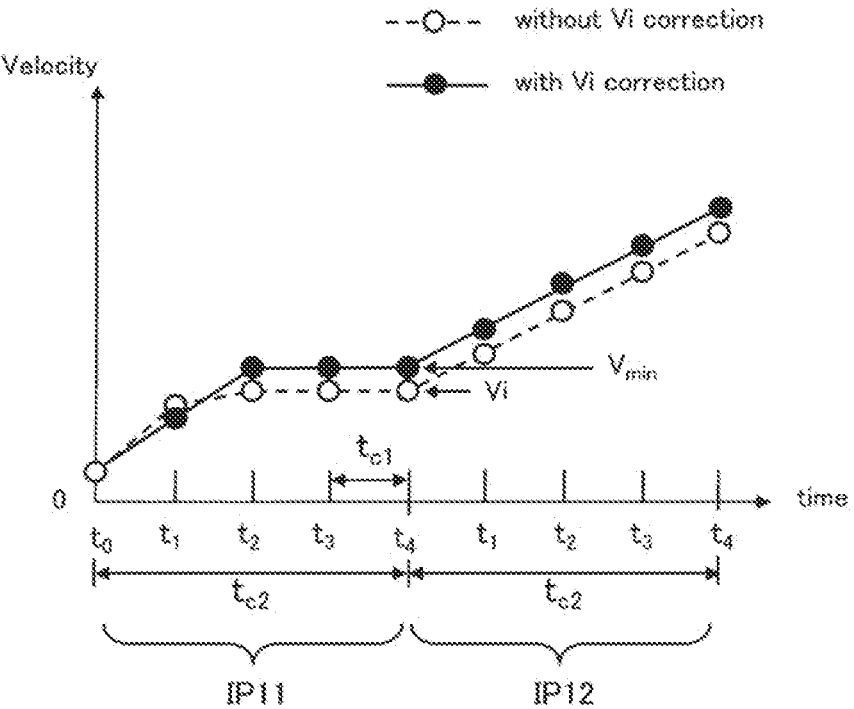
FIG. 5B is a graph showing path speed by the correction in which the lower limit speed in the next interpolation zone is considered.
Figure 5C:
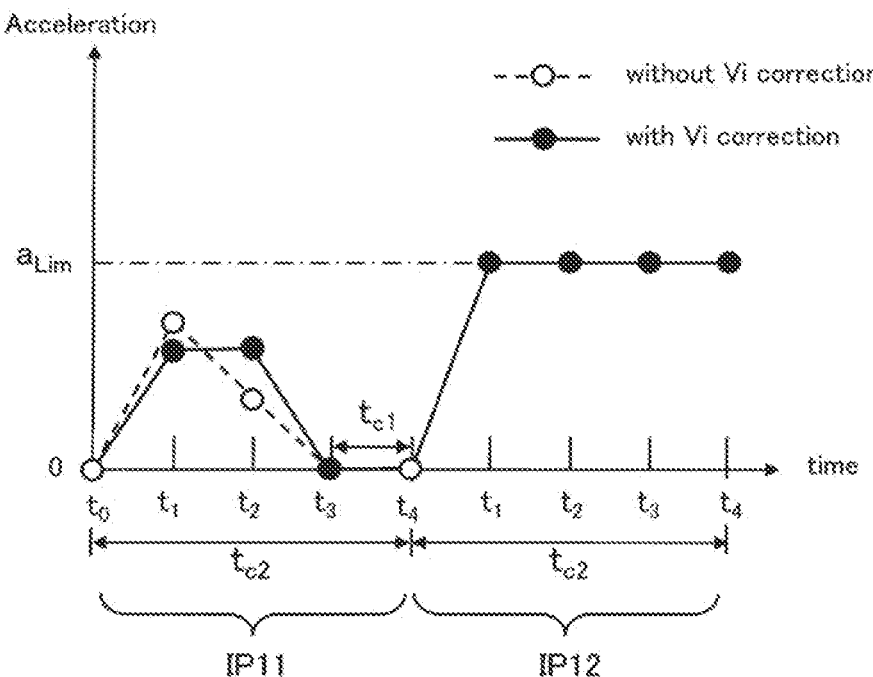
FIG. 5C is a graph showing path acceleration by the correction in which the lower limit speed in the next interpolation zone is considered.

FIG. 5A through FIG. 5C respectively show the path positions, the path speed, and the path acceleration by a correction in which the lower limit speed $V_{min}$ in the next interpolation zone is taken into consideration. In these drawings, the interpolation zone IP11 is the zone subject to the present interpolation. Specifically, the target position Tp11 at the starting point of the interpolation zone IP11 shown in FIG. 5A is the "first target position $Tp_N$," the target position Tp12 at the end point of the interpolation zone IP11 is the "second target position $Tp_{N+1}$," and the target position Tp13 at the end point of the next interpolation zone IP12 is the "third target position $Tp_{N+2}$." Further, in FIG. 5A through FIG. 5C, the dots expressed as "without a correction of initial speed Vi (without Vi correction)" represent the result when the correction processing by the steps S210 through S240 is not performed. It should be noted that the path positions "without the correction of the initial speed Vi"

shown in FIG. 5A are the result of performing the simple linear interpolation in the interpolation zone IP11.

In the step S220 shown in FIG. 3, the initial speed Vi at the starting point of the next interpolation zone IP12 is calculated. The initial speed Vi is equal to the speed at the end time point $t_4$ in the present interpolation zone IP11.

In the step S230, whether or not the initial speed Vi at the starting point of the next interpolation zone IP12 is no lower than the lower limit speed $V_{min}$ is determined. When the initial speed Vi is no lower than the lower limit speed $V_{min}$, the whole of the processing shown in FIG. 3 is terminated. In contrast, when the initial speed Vi fails to be no lower than the lower limit speed $V_{min}$, the process proceeds to the step S240, and the path speed is corrected taking the lower limit speed $V_{min}$ into consideration.

As shown in FIG. 5B, in the path positions "without the correction of the initial speed Vi," the initial speed Vi at the starting point of the next interpolation zone IP12 is lower than the lower limit speed $V_{min}$. In this case, as shown in FIG. 5A, the target position Tp13 cannot be reached at the end point of the next interpolation zone IP12. Therefore, in this case, a correction of the path speed is performed with respect to the present interpolation zone IP11.

In the example of the "with the correction of the initial speed Vi (with Vi correction)" shown in FIG. 5B, the path speed is corrected so that the speed linearly increases from the starting time point $t_0$ in the present interpolation zone IP11, and reaches the lower limit speed $V_{min}$ at the time point $t_2$. As a result, in the path speed after the correction, the initial speed at the starting point of the next interpolation zone IP12 is made equal to the lower limit speed $V_{min}$. As is understood from the acceleration shown in FIG. 5C, the correction of the path speed is performed so that the integration of the acceleration in the present interpolation zone IP11, namely the increment of the speed, becomes larger than that before the correction of the path speed. It should be noted that it is possible to adopt a variety of methods other than the method shown in FIG. 5B as the correction method of the path speed in the step S240. For example, it is possible to correct the path speed so as not to reach the lower limit speed $V_{min}$ at the time point $t_3$ before the end point of the present interpolation zone IP11, but to become no lower than the lower limit speed $V_{min}$ at the end time point $t_4$. In any of the correction methods, the correction is performed so that the path speed at the end point of the present interpolation zone IP11 becomes no lower than the lower limit speed $V_{min}$, and at the same time, the path position at the estimated arrival time at the end point of the present interpolation zone IP11 becomes equal to the target position Tp12.

Figure 6:
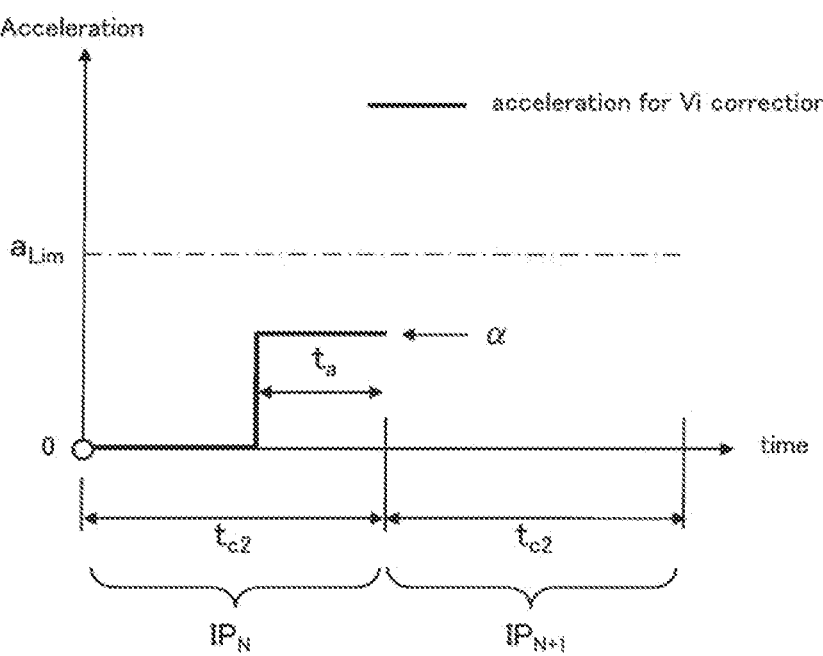
FIG. 6 is a graph showing an example of an acceleration variation for achieving the lower limit speed in the next interpolation zone.

FIG. 6 is a graph showing an example of an acceleration variation for obtaining the path speed for achieving the lower limit speed $V_{min}$ in the next interpolation zone. In this example, it is assumed that the acceleration is zero to the middle of the present interpolation zone IP$_N$, and then the acceleration is performed at constant acceleration α in a period $t_a$ from the middle to the end point of the interpolation zone IP$_N$. The acceleration α is no higher than the acceleration limit $a_{Lim}$. In this case, when assuming a condition that the path speed at the end point of the present interpolation zone IP$_N$ is equal to the lower limit speed $V_{min}$, and the path position at the estimated arrival time at the end point of the present interpolation zone IP$_N$ is equal to the target position Tp$_{N+1}$, the following formulas [5a], [5b] become true.

[Math. 5]

$$v_{min} = V_N + \alpha * t_a \tag{5a}$$

$$Tp_{N+1} - Tp_N = V_N * t_{c2} + \frac{1}{2}\alpha * t_a^2 \tag{5b}$$

Here, $V_N$ represents speed at the starting point of the present interpolation zone IP$_N$, Tp$_{N+1}$ represents the target position at the end point of the present interpolation zone IP$_N$, Tp$_N$ represents the target position at the starting point of the present interpolation zone IP$_N$, and $t_{c2}$ represents the second control period.

By solving the formulas [5a], [5b] described above, it is possible to obtain the solutions of the acceleration α and the time $t_a$ shown in FIG. 6. By performing the acceleration shown in FIG. 6 in the present interpolation zone IP$_N$ using these solutions, it is possible to make the initial speed Vi at the starting point of the next interpolation zone IP$_{N+1}$ the same as the lower limit speed $V_{min}$. It should be noted that by setting the left-hand side of the formula [5a] to a value obtained by multiplying the lower limit speed $V_{min}$ by a coefficient no smaller than 1, it is possible to make the initial speed Vi at the starting point of the next interpolation zone IP$_{N+1}$ no smaller than the lower limit speed $V_{min}$.

When the correction of the path speed in the step S240 ends, the process returns to the step S220, and the initial speed Vi at the starting point of the next interpolation zone IP12 is calculated once again. Further, in the step S230, whether or not the initial speed Vi at the starting point of the next interpolation zone IP12 is no lower than the lower limit speed $V_{min}$ is determined. In such a manner, the steps S220 through S240 are repeated until the initial speed Vi becomes no lower than the lower limit speed $V_{min}$. It should be noted that when the correction processing in the step S240 is performed so that $V_{min} \leq Vi$ is true, it is possible to arrange that the processing shown in FIG. 3 is terminated after executing the step S240.

As described hereinabove, in the embodiment described above, since the correction of the path positions taking the acceleration limit into consideration is performed in the steps S120 through S140 shown in FIG. 3, it is possible to determine the path positions of the robot without causing the exceedance over the acceleration limit. Further, in the steps S210 through S240, since the correction of the path speed between the first target position and the second target position is performed so that the path speed at the second target position becomes no lower than the lower limit speed, it is possible to determine the path so that the third target position can be reached at the estimated arrival time at the third target position.

It should be noted that it is possible to eliminate either one of the processing in the steps S120 through S140 and the processing in the steps S210 through S240.

B. Second Embodiment

FIG. 7 is a flowchart showing a procedure of interpolation processing of path positions in a second embodiment. Differences between the interpolation processing shown in FIG. 7 and the interpolation processing in the first embodiment shown in FIG. 3 are three points, namely the point that the step S215 is added after the step S210, the point that the step S235 is added after the step S230, and the point that the step S240 is replaced with the step S245, and the rest of the interpolation processing shown in FIG. 7 is the same as shown in FIG. 3.

In the step S215, an upper limit speed $V_{max}$ at the starting point of the next interpolation zone is calculated. When assuming that the next interpolation zone is a zone from the second target position $Tp_{N+1}$ to the third target position $Tp_{N+2}$, the upper limit speed $V_{max}$ at the starting point of the next interpolation zone is the speed at which the third target position $Tp_{N+2}$ is not exceeded at an estimated arrival time at the third target position $Tp_{N+2}$ when assuming that deceleration is performed at a deceleration limit $b_{Lim}$ to the third target position $Tp_{N+2}$. The upper limit speed $V_{max}$ can be calculated with, for example, the following formula.

[Math. 6]

$$V_{max} = \frac{\left[(Tp_{N+2} - Tp_{N+1}) + \frac{1}{2}b_{Lim} * t_{c2}^2\right]}{t_{c2}}$$
$$= \frac{\left[(Tp_{N+2} - Tp_{N+1}) + \frac{1}{2}b_{Lim} * (t_{c1} * m)^2\right]}{t_{c1} * m}. \qquad [6]$$

Here, $Tp_{N+1}$ represents the second target position, $Tp_{N+2}$ represents the third target position, $b_{Lim}$ represents the deceleration limit, $t_{c1}$ represents the first control period, $t_{c2}$ represents the second control period, and m represents the interpolation number.

A second term of a numerator in a right-hand side of the formula [6] described above corresponds to a positional variation due to a speed variation, namely a decrement in distance due to the deceleration, when performing the deceleration at the deceleration limit $b_{Lim}$ from the second target position $Tp_{N+1}$ until the third target position $Tp_{N+2}$ is reached. The upper limit speed $V_{max}$ at the starting point of the next interpolation zone is obtained by adding the positional variation to the difference between the third target position $Tp_{N+2}$ and the second target position $Tp_{N+1}$, and then dividing the addition result by the length of the second control period $t_{c2}$.

When expressing the formula [6] described above with discrete values in every first control period $t_{c1}$, the formula [6] can be rewritten to the following formula [7].

[Math. 7]

$$\Delta p'_{max} = \frac{\left[(Tp_{N+2} - Tp_{N+1}) + \sum_{k=1}^{m}\{(b_{Lim} * t_{c1}) * k\}\right]}{m}. \qquad [7]$$

Here, $\Delta p'_{max}$ max represents an upper limit value of the positional increment at the starting point of the next interpolation zone, and is substantively the same as the upper limit speed $V_{max}$ in the formula [6] described above.

A second term of a numerator in a right-hand side of the formula [7] described above corresponds to a positional variation due to a speed variation when performing the deceleration at the deceleration limit $b_{Lim}$ from the second target position $Tp_{N+1}$ until the third target position $Tp_{N+2}$ is reached. Further, the interpolation number m in the denominator in the right-hand side of the formula [7] is a value corresponding to the length of the second control period $t_{c2}$. As described above, the upper limit speed $V_{max}$ or $\Delta p'_{max}$ at the starting point of the next interpolation zone can be obtained by adding the positional variation due to the speed variation when performing the deceleration at the deceleration limit $b_{Lim}$ from the second target position $Tp_{N+1}$ until the third target position $Tp_{N+2}$ is reached to the difference between the third target position $Tp_{N+2}$ and the second target position $Tp_{N+1}$, and then dividing the addition result by a value corresponding to the length of the second control period $t_{c2}$.

The processing contents of the steps S220, S230 after the step S215 shown in FIG. 7 are the same as those of these steps in FIG. 3. In the step S230, when the initial speed Vi at the starting point of the next interpolation zone fails to be no lower than the lower limit speed $V_{min}$, the process proceeds to the step S245, and the path speed is corrected taking the lower limit speed $V_{min}$ into consideration. In contrast, when the initial speed Vi is no lower than the lower limit speed $V_{min}$, the process proceeds to the step S235.

In the step S235, whether or not the initial speed Vi at the starting point of the next interpolation zone is no higher than the upper limit speed $V_{max}$ is determined. When the initial speed Vi is no higher than the upper limit speed $V_{max}$, the whole of the processing shown in FIG. 7 is terminated. In contrast, when the initial speed Vi fails to be no higher than the upper limit speed $V_{max}$, the process proceeds to the step S245, and the path speed is corrected taking the upper limit speed $V_{max}$ into consideration. It should be noted that although the description of a specific correction method of correcting the path speed taking the upper limit speed $V_{max}$ into consideration is omitted, it is possible to execute the correction according to the method of correcting the path speed taking the lower limit speed $V_{min}$ into consideration described in the first embodiment.

As described above, in the second embodiment, since the correction of the path speed between the first target position and the second target position is performed so that the path speed at the second target position as the starting point of the next interpolation zone becomes no higher than the upper limit speed $V_{max}$, it is possible to determine the path so that the third target position can be reached at the estimated arrival time at the third target position.

It should be noted that in the second embodiment, it is possible to arrange that whether or not the path acceleration exceeds the deceleration limit $b_{Lim}$ is determined after linear interpolation in the step S110, for example, after step S130, and when the path acceleration exceeds the deceleration limit $b_{Lim}$, the path position is corrected so that the path acceleration becomes no higher than the deceleration limit $b_{Lim}$. This point is substantially the same as in the first embodiment.

Other Embodiments

The present disclosure is not limited to the embodiments described above, but can be implemented in a variety of aspects within the scope or the spirit of the present disclosure. For example, the present disclosure can also be implemented by the following aspects. The technical features in the embodiments described above corresponding to the technical features in each of the aspects described below can arbitrarily be replaced or combined in order to solve some or all of the problems of the present disclosure, or to achieve some or all of the advantages of the present disclosure. Further, the technical feature can arbitrarily be eliminated unless described in the present specification as an essential element.

(1) According to a first aspect of the present disclosure, there is provided a path generation method of generating a path of a robot using a command from an external apparatus. This path generation method includes (a) sequentially receiving command information including a control command from the external apparatus with a second control period longer than a first control period as a control period of a path related to a target position of a joint of the robot, and (b) determining a path position in each of the first control periods with interpolation between a first target position and a second target position next to the first target position using a first control command representing the first target position and a second control command representing the second target position, wherein the step (b) includes (b1) obtaining the path position in each of the first control periods by performing linear interpolation between the first target position and the second target position, (b2) determining whether or not path speed at the second target position is no lower than a lower limit speed at which a third target position next to the second target position is reached at an estimated arrival time at the third target position when assuming that the path speed at the second target position is accelerated at an acceleration limit to the third target position using a third control command representing the third target position, and (b3) correcting the path speed between the first target position and the second target position so that the path speed at the second target position becomes no lower than the lower limit speed when it is determined that the path speed at the second target position fails to be no lower than the lower limit speed.

According to this path generation method, since the correction of the path speed between the first target position and the second target position is performed so that the path speed at the second target position becomes no lower than the lower limit speed after performing the linear interpolation, it is possible to determine the path so that the third target position can be reached at the estimated arrival time at the third target position.

(2) In the path generation method described above, the lower limit speed may be obtained by subtracting a positional variation due to a speed variation when accelerated at the acceleration limit from the second target position until the third target position is reached from a difference between the third target position and the second target position, and then dividing a value obtained by the subtraction by a value corresponding to a length of the second control period.

According to this path generation method, it is possible to obtain the lower limit speed at the second target position with a simple calculation.

(3) In the path generation method described above, after the step (b3), the step (b) may include (b4) determining whether or not the path speed at the second target position is no higher than upper limit speed at which the third target position is not exceeded at the estimated arrival time at the third target position when assuming that the path speed at the second target position is decelerated at a deceleration limit to the third target position, and (b5) correcting the path speed between the first target position and the second target position so that the path speed at the second target position becomes no higher than the upper limit speed when it is determined that the path speed at the second target position fails to be no higher than the upper limit speed.

According to this path generation method, since the correction of the path speed between the first target position and the second target position is performed so that the path speed at the second target position becomes no higher than the upper limit speed, it is possible to determine the path so that the third target position can be reached at the estimated arrival time at the third target position.

(4) In the path generation method described above, between the step (b1) and the step (b2), the step (b) may include correcting the path position so that path acceleration obtained from an interpolation result of the linear interpolation becomes no higher than the acceleration limit when the path acceleration exceeds the acceleration limit.

According to this path generation method, since the correction of the path position taking the acceleration limit into consideration is performed, it is possible to determine the path position of the robot without causing the exceedance over the acceleration limit.

(5) According to a second aspect of the present disclosure, there is provided a robot control system. The robot control system is provided with a robot having a servo controller, a robot controller configured to transmit a control command to the servo controller, and an external apparatus configured to sequentially transmit command information including a control command to the robot controller with a second control period longer than a first control period as a control period of a path related to a target position of a joint of the robot. The robot controller is configured to execute (a) processing of sequentially receiving the command information from the external apparatus with the second control period, and (b) processing of determining a path position in each of the first control periods with interpolation between a first target position and a second target position next to the first target position using a first control command representing the first target position and a second control command representing the second target position. The processing (b) includes (b1) processing of obtaining the path position in each of the first control periods by performing linear interpolation between the first target position and the second target position, and (b2) processing of correcting the path position so that path acceleration obtained from an interpolation result of the linear interpolation becomes no higher than acceleration limit when the path acceleration exceeds the acceleration limit.

The present disclosure can be implemented in a variety of aspects other than the above. For example, it is possible to implement the present disclosure in an aspect such as a robotic system provided with a robot and a robot control device, a computer program for realizing the function of the robot control device, or a non-transitory storage medium recording the computer program.

What is claimed is:

1. A path generation method of generating a path of a robot using a command from an external apparatus, the method comprising:

(a) sequentially receiving command information including a plurality of control commands from the external apparatus with a second control period longer than a first control period as a control period of a path related to a plurality of target sub-path positions of a joint of the robot, the first control period corresponding to an interpolation period being defined between a first target position and a second target position next to the first target position; and (b) determining, by a robot controller, the plurality of target sub-path positions in the interpolation period with interpolation using the plurality of control commands representing positions of the joint of the robot on the path between the first and second target positions, wherein the step (b) includes:

(b1) obtaining, by the robot controller, each of the plurality of target sub-path positions in each of the first control periods by performing linear interpolation between the first target position and the second target position;

(b2) determining, by the robot controller, for each of the plurality of target sub-path positions, whether path acceleration obtained from an interpolation result of the linear interpolation at one of the plurality of target sub-path positions is higher than an acceleration limit;

(b3) correcting, by the robot controller, the one of the plurality of sub-path positions to a corrected target sub-path position;

(b4) determining, by the robot controller, whether or not path speed at the second target position is no lower than lower limit speed at which a third target position next to the second target position is reached at an estimated arrival time at the third target position when assuming that the path speed at the second target position is accelerated at the acceleration limit to the third target position using a third control command of the plurality of control commands representing the third target position; and (b5) correcting, by the robot controller, the path speed between the first target position and the second target position so that the path speed at the second target position becomes no lower than the lower limit speed when it is determined that the path speed at the second target position fails to be no lower than the lower limit speed, wherein the robot is configured to perform an operation along either the plurality of target sub-path positions without the corrected sub-path position or the plurality of target sub-path positions including the corrected sub-path position.

2. The path generation method according to claim 1, wherein the lower limit speed is obtained by subtracting a positional variation due to a speed variation when accelerated at the acceleration limit from the second target position until the third target position is reached from a difference between the third target position and the second target position, and then dividing a value obtained by the subtraction by a value corresponding to a length of the second control period.

3. The path generation method according to claim 1, wherein after the step (b5), the step (b) includes:

(b6) determining, by the robot controller, whether or not the path speed at the second target position is no higher than upper limit speed at which the third target position is not exceeded at the estimated arrival time at the third target position when assuming that path speed at the second target position is decelerated at a deceleration limit to the third target position, and; and (b7) correcting, by the robot controller, the path speed between the first target position and the second target position so that the path speed at the second target position becomes no higher than the upper limit speed when it is determined that the path speed at the second target position fails to be no higher than the upper limit speed.

4. A robot control system comprising:

a robot having a servo controller;

a robot controller configured to transmit a servo control command to the servo controller; and an external apparatus configured to sequentially transmit command information including a plurality of control commands to the robot controller with a second control period longer than a first control period as a control period of a path related to a plurality of target sub-path positions of a joint of the robot, the first control period corresponding to an interpolation period being defined between a first target position and a second target position next to the first target position, wherein the robot controller is configured to execute;

(a) processing of sequentially receiving the command information from the external apparatus with the second control period; and (b) processing of determining the plurality of target sub-path positions in the interpolation period with interpolation using the plurality of control commands representing positions of the joint of the robot on the path between the first and second target positions, the processing (b) includes:

(b1) processing of obtaining each of the plurality of target sub-path positions in each of the first control periods by performing linear interpolation between the first target position and the second target position;

(b2) processing of determining, for each of the plurality of target sub-path positions, whether path acceleration obtained from an interpolation result of the linear interpolation at one of the plurality of target sub-path positions is higher than an acceleration limit;

(b3) processing of correcting the one of the plurality of target sub-path positions to a corrected target sub-path position;

(b4) processing of determining whether or not path speed at the second target position is no lower than lower limit speed at which a third target position next to the second target position is reached at an estimated arrival time at the third target position when assuming that the path speed at the second target position is accelerated at the acceleration limit to the third target position using a third control command of the plurality of control commands representing the third target position; and (b5) processing of correcting the path speed between the first target position and the second target position so that the path speed at the second target position becomes no lower than the lower limit speed when it is determined that the path speed at the second target position fails to be no lower than the lower limit speed, wherein the robot is configured to perform an operation along either the plurality of target sub-path positions without the corrected sub-path position or the plurality of target sub-path positions including the corrected sub-path position.

* * * * *